United States Patent
Sahoo et al.

(10) Patent No.: US 9,767,312 B2
(45) Date of Patent: Sep. 19, 2017

(54) SYSTEM AND METHOD FOR INTEGRATING A CLOUD PLATFORM ENVIRONMENT WITH AN APPLICATION SERVER OR OTHER ENVIRONMENT

(71) Applicant: ORACLE INTERNATIONAL CORPORATION, Redwood Shores, CA (US)

(72) Inventors: Sanjeeb Kumar Sahoo, Cupertino, CA (US); Lawrence Feigen, Watchung, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 63 days.

(21) Appl. No.: 14/527,307

(22) Filed: Oct. 29, 2014

(65) Prior Publication Data
US 2015/0120900 A1    Apr. 30, 2015

Related U.S. Application Data

(60) Provisional application No. 61/897,728, filed on Oct. 30, 2013.

(51) Int. Cl.
*G06F 21/62* (2013.01)
*H04L 12/24* (2006.01)
(Continued)

(52) U.S. Cl.
CPC ........ *G06F 21/6227* (2013.01); *G06F 21/604* (2013.01); *H04L 41/02* (2013.01); *H04L 41/5054* (2013.01); *H04L 67/1002* (2013.01); *H04L 67/2838* (2013.01); *G06F 2221/2141* (2013.01); *H04L 41/5096* (2013.01)

(58) Field of Classification Search
CPC ............... G06F 21/604; G06F 21/6227; G06F 2221/2141; H04L 41/02; H04L 67/1002; H04L 67/2838
See application file for complete search history.

(56) References Cited

U.S. PATENT DOCUMENTS 7,296,022 B2    11/2007  Harjanto
8,615,731 B2    12/2013  Doshi
(Continued)

OTHER PUBLICATIONS

United States Patent and Trademark Office, Notice of Allowance dated July 13, 2017 for U.S. Appl. No. 14/476,557, 9 Pages.

*Primary Examiner* — Arvin Eskandarnia
*Assistant Examiner* — Gil H. Lee
(74) *Attorney, Agent, or Firm* — Tucker Ellis LLP

(57) ABSTRACT

In accordance with an embodiment, described herein is a system and method for integrating a cloud platform with an application server or other environment, for example, a WebLogic environment. A cloud platform runtime including a cloud server can be embedded within an application server container, so that the cloud server domain can execute within the application server domain. An integration bridge and integration components support integration between the cloud server and the application server. Cloud server components can be used as part of the application server domain, including for example, administration, logging and diagnostics, security, and configuration management.

17 Claims, 13 Drawing Sheets

(51) Int. Cl.
*H04L 29/08* (2006.01)
*G06F 21/60* (2013.01)

(56) References Cited

U.S. PATENT DOCUMENTS

| | | |
|---|---|---|
| 9,214,090 B2 | 12/2015 | Hillier et al. |
| 2004/0194059 A1 | 9/2004 | Akella |
| 2007/0061798 A1 | 3/2007 | Atsatt |
| 2007/0198475 A1 | 8/2007 | Meduri |
| 2008/0189679 A1 | 8/2008 | Rodriguez et al. |
| 2009/0265683 A1 | 10/2009 | Salgar et al. |
| 2009/0276755 A1 | 11/2009 | Beltowski |
| 2011/0078659 A1 | 3/2011 | Stark |
| 2012/0005663 A1 | 1/2012 | Burchart |
| 2012/0117644 A1 | 5/2012 | Soeder |
| 2012/0311157 A1* | 12/2012 | Erickson ............... G06F 9/541 709/226 |
| 2014/0012826 A1* | 1/2014 | Wisman ............ G06F 17/3023 707/695 |
| 2014/0298332 A1 | 10/2014 | Cai |
| 2014/0344782 A1 | 11/2014 | Hill et al. |

* cited by examiner

SYSTEM AND METHOD FOR INTEGRATING A CLOUD PLATFORM ENVIRONMENT WITH AN APPLICATION SERVER OR OTHER ENVIRONMENT

CLAIM OF PRIORITY

This application claims the benefit of priority to U.S. Provisional Application titled "SYSTEM AND METHOD FOR INTEGRATING A CLOUD PLATFORM ENVIRONMENT WITH OTHER ENVIRONMENTS", Application No. 61/897,728, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and providing services within such environments, and are particularly related to systems and methods for integrating a cloud platform environment with an application server or other environment.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. In some organizations, system administrators and other users may be already familiar with administering and using a particular software environment, for example a WebLogic application server environment. In such situations, it can be beneficial to provide access to a cloud environment in a manner that is familiar to those users. These are examples of the types of environments in which embodiments of the invention can be used.

SUMMARY

In accordance with an embodiment, described herein is a system and method for integrating a cloud platform with an application server or other environment, for example, a WebLogic environment. A cloud platform runtime including a cloud server can be embedded within an application server container, so that the cloud server domain can execute within the application server domain. An integration bridge and integration components support integration between the cloud server and the application server. Cloud server components can be used as part of the application server domain, including for example, administration, logging and diagnostics, security, and configuration management.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
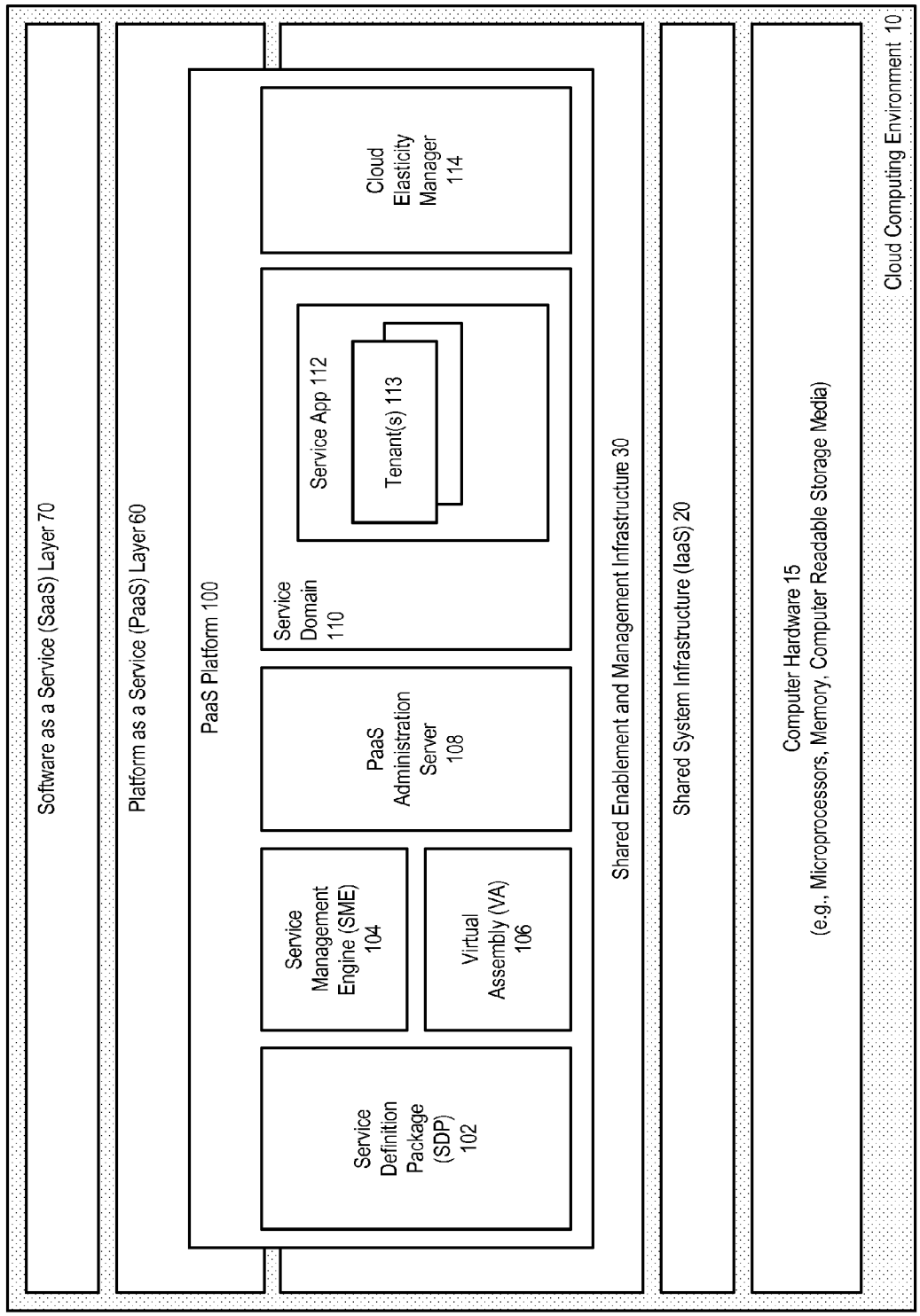
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
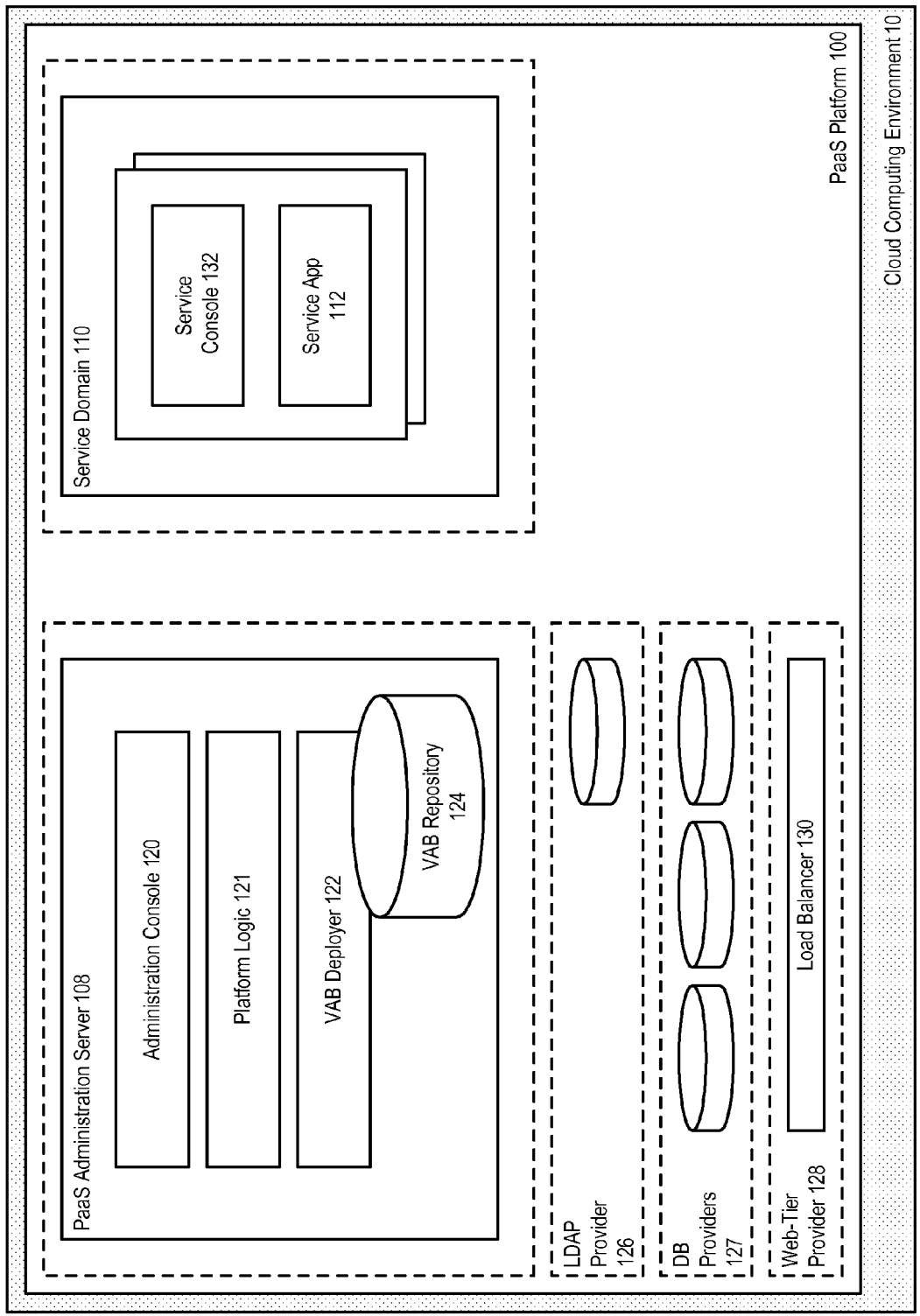
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and load-balancer 128 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
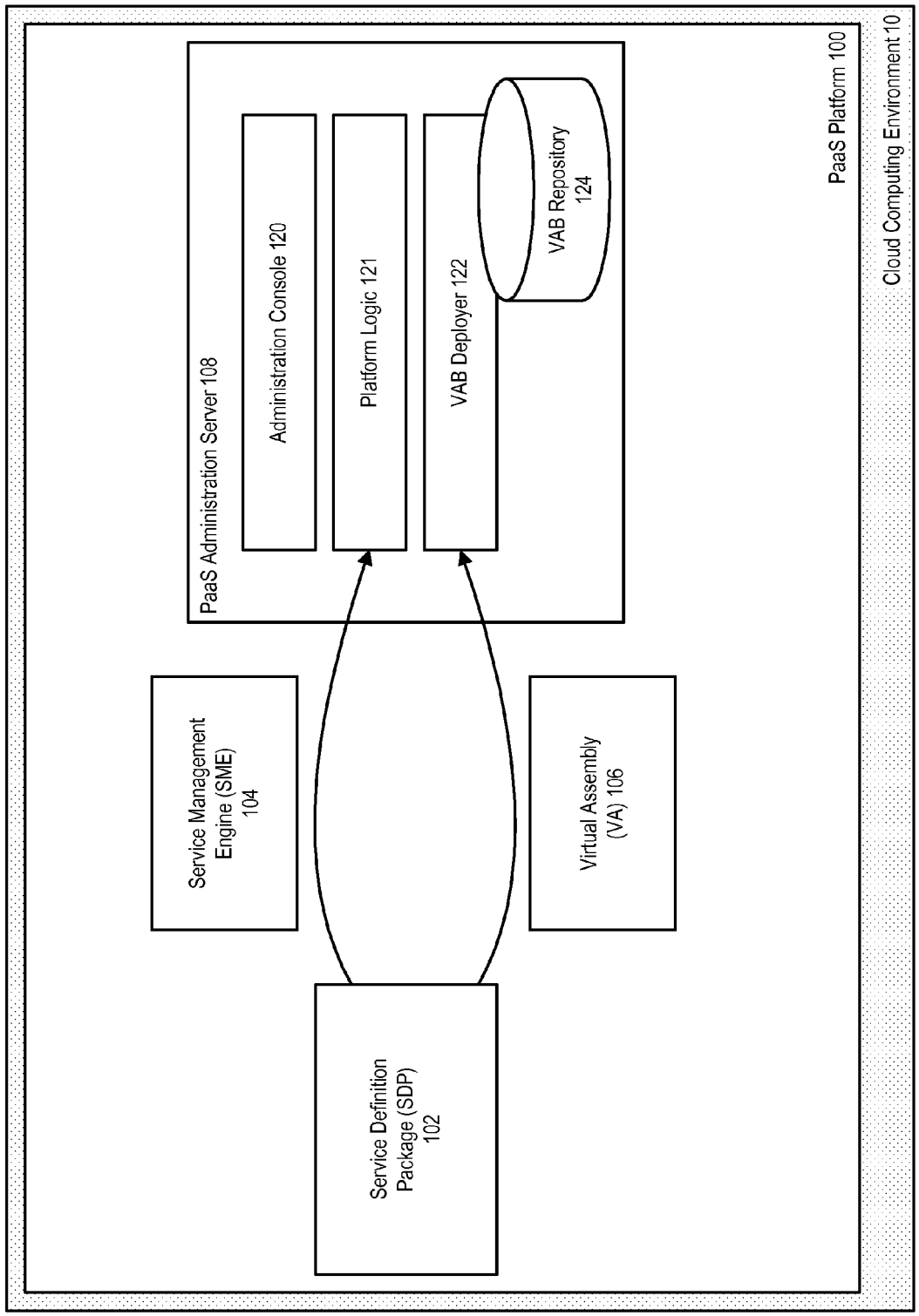
FIG. 3 illustrates the use of service definition packages and service management engines with an administration server, in accordance with an embodiment.

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
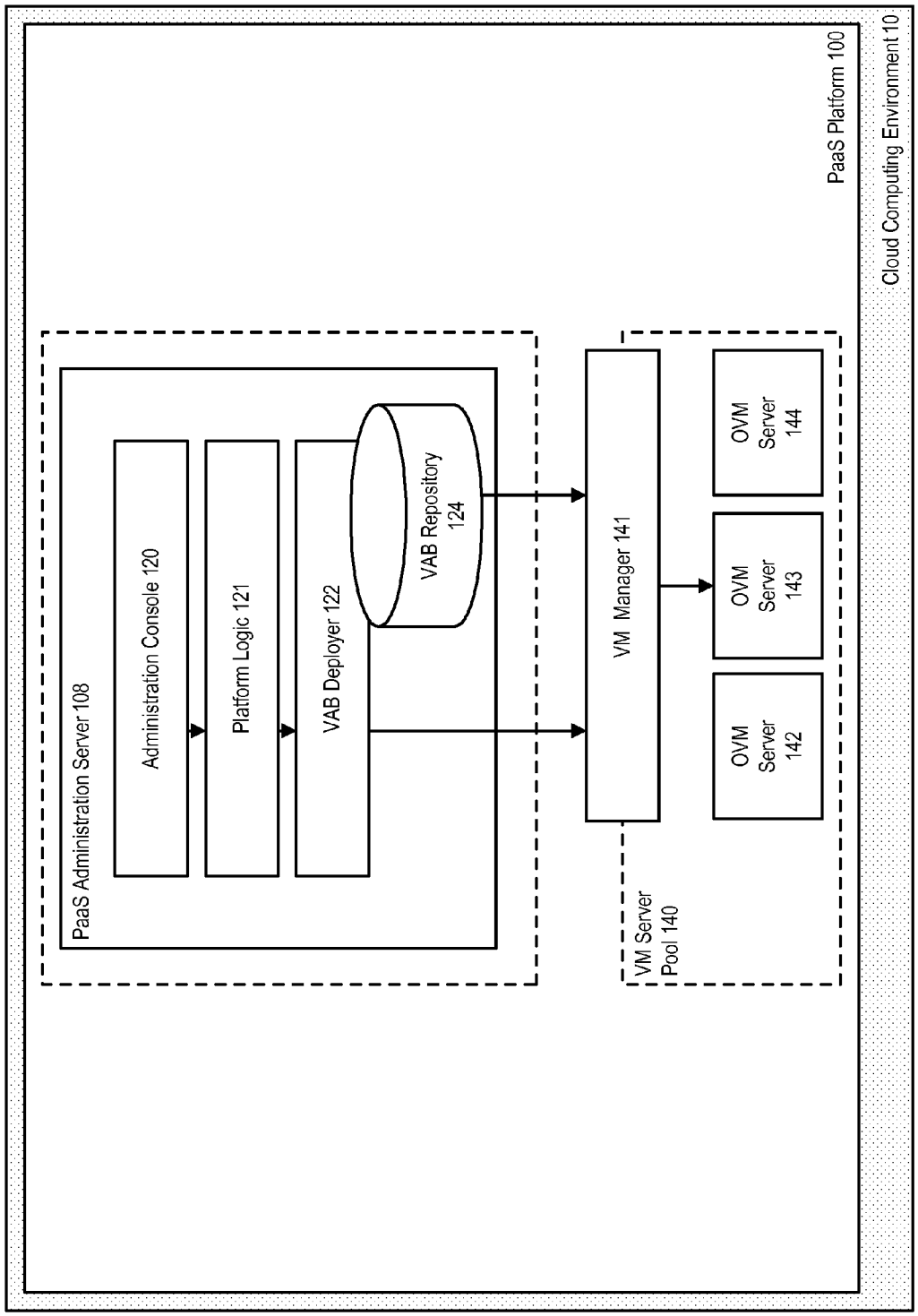
FIG. 4 illustrates the interaction between an administration server and a virtualization manager, in accordance with an embodiment.

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
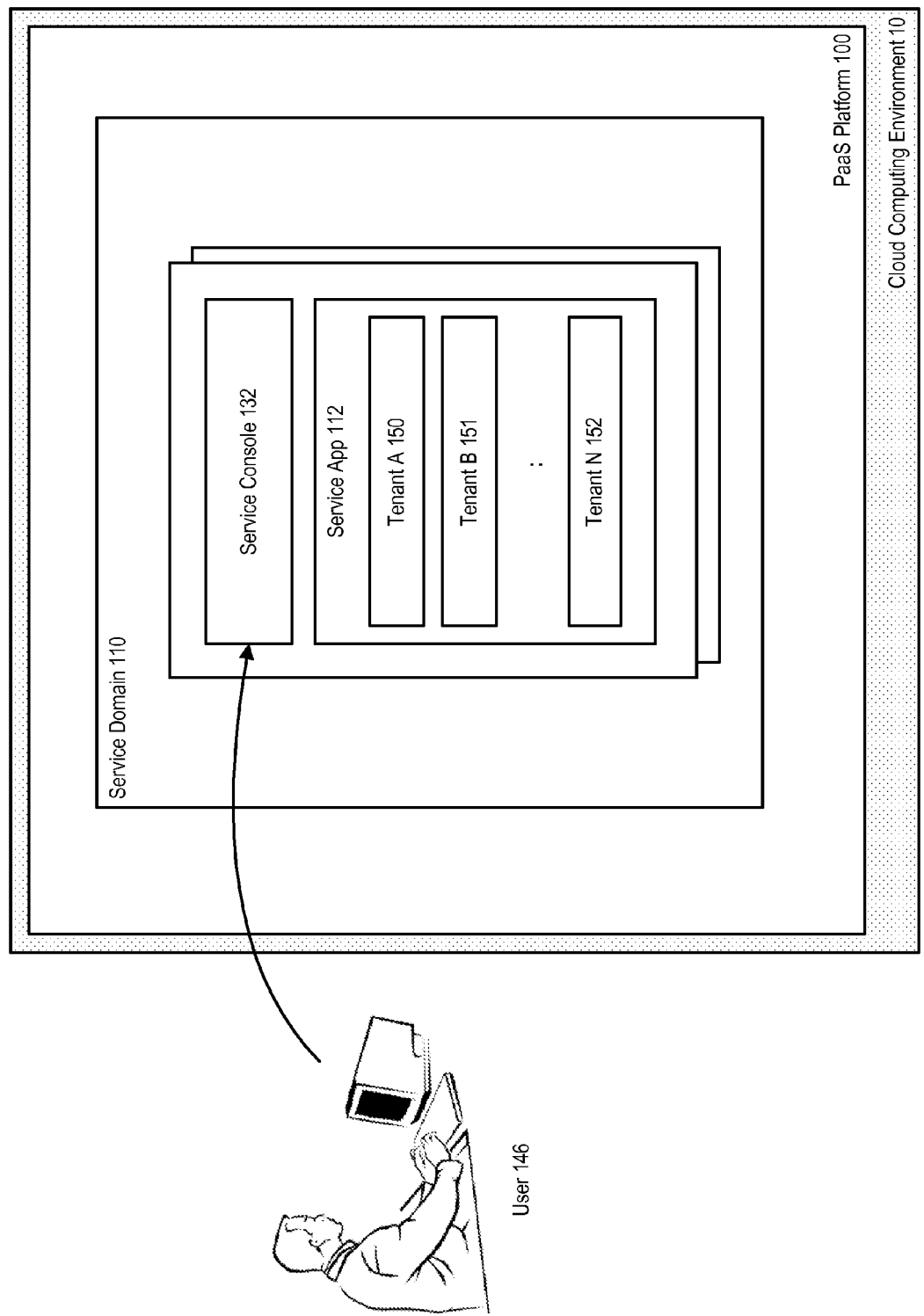
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
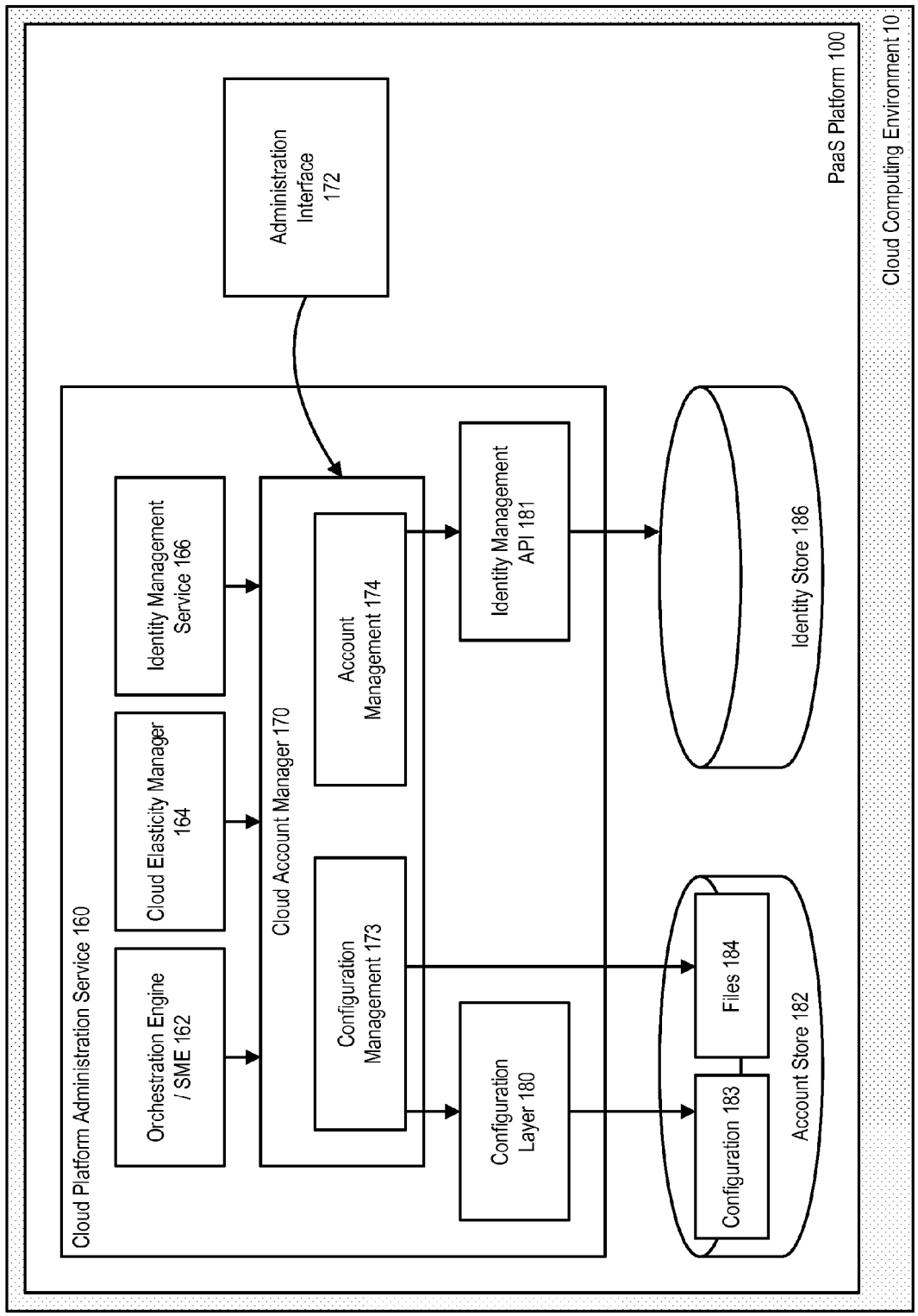
FIG. 6 illustrates a cloud account manager, in accordance with an embodiment.

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
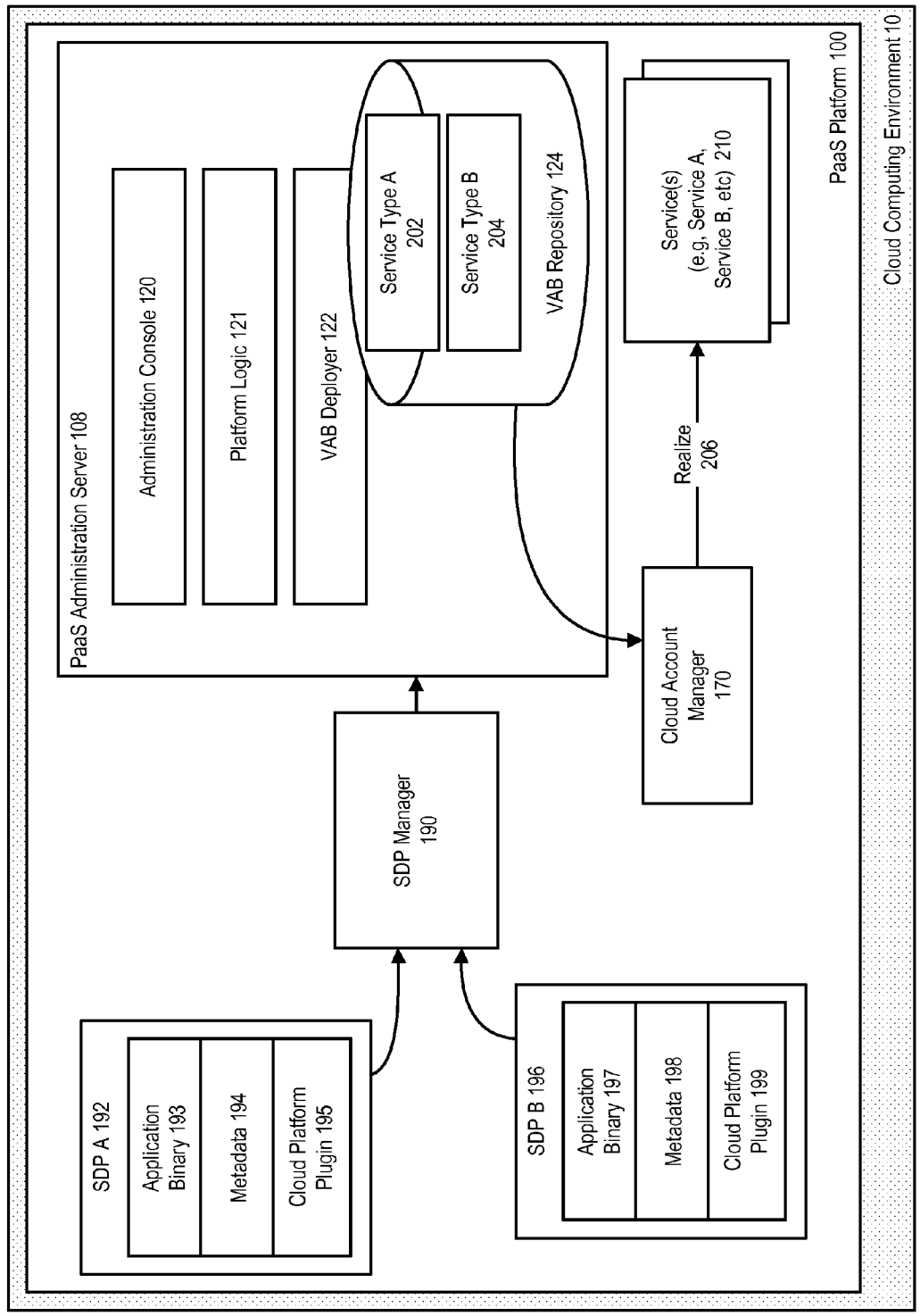
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
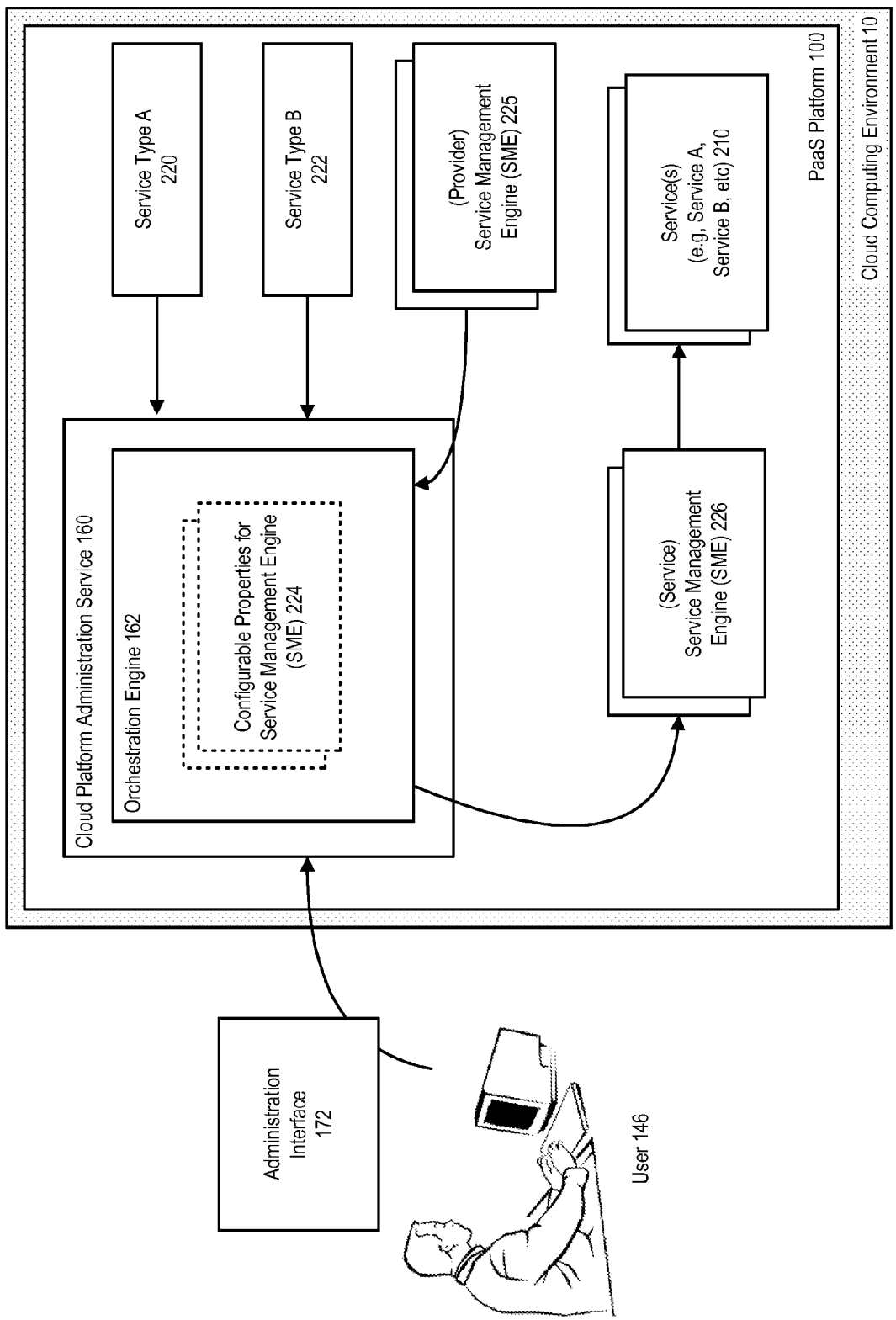
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
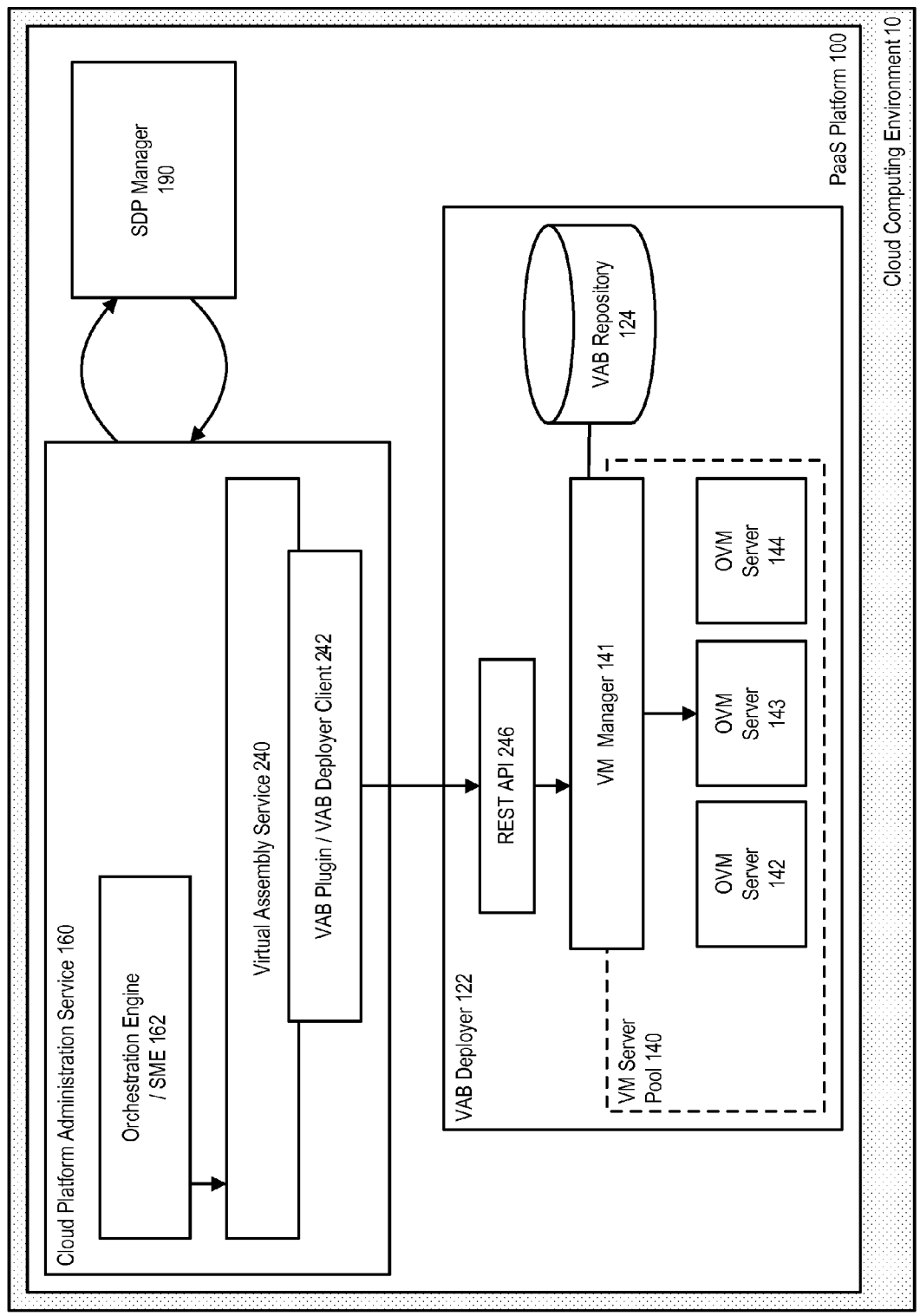
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
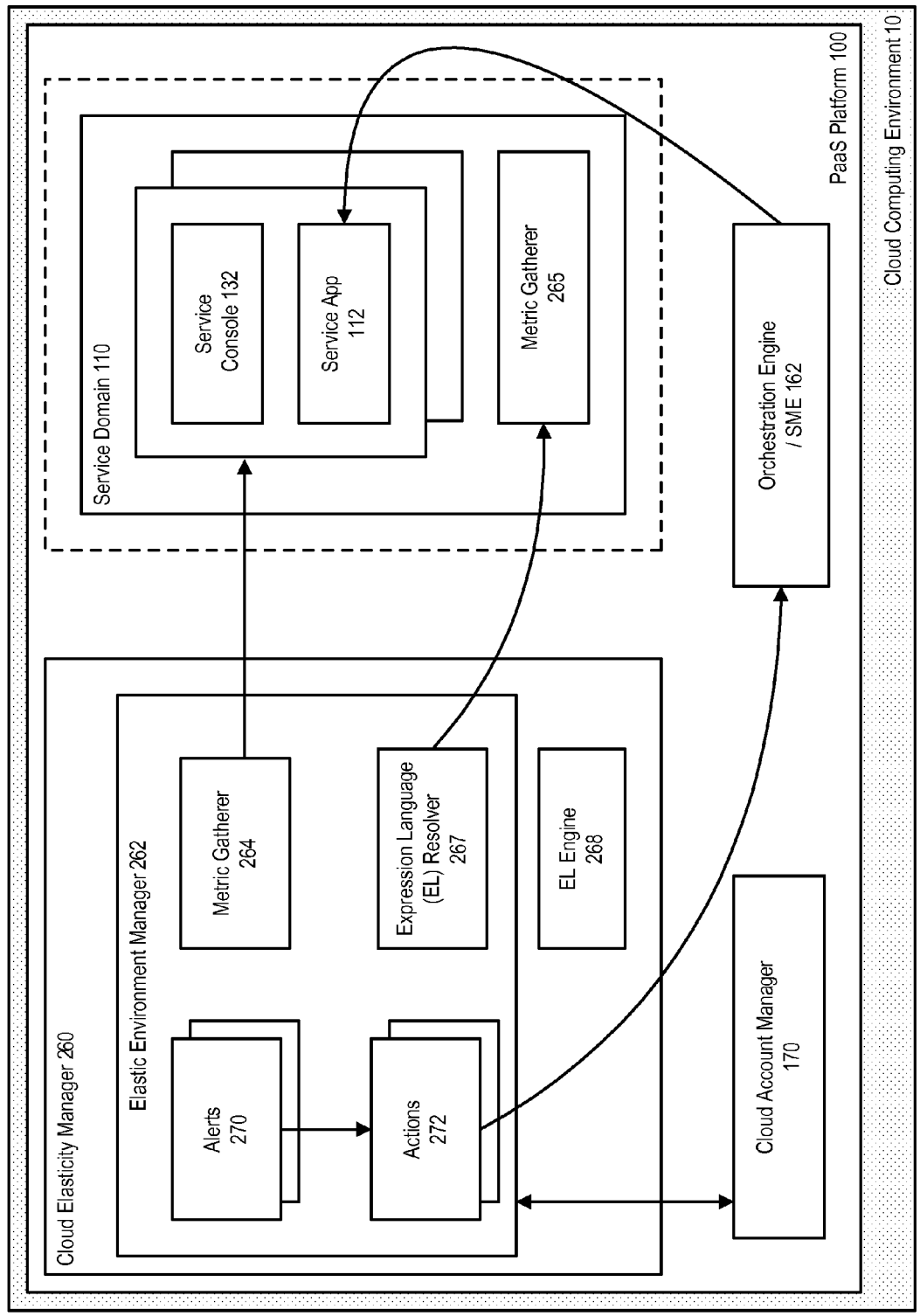
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime.

Application Server Integration

As described above, in accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization.

In some organizations, system administrators and other users may be already familiar with administering and using a particular software environment, for example a WebLogic application server environment. In such situations, it can be beneficial to provide access to a cloud environment in a manner that is familiar to those users.

In accordance with an embodiment, described herein is a system and method for integrating a cloud platform with an application server or other environment, for example, a WebLogic environment. A cloud platform runtime including a cloud server can be embedded within an application server container, so that the cloud server domain can execute within the application server domain. An integration bridge and integration components support integration between the cloud server and the application server. Cloud server components can be used as part of the application server domain, including for example, utilizing the administration, logging and diagnostics, security, and configuration management features provided by the application server.

For example, in accordance with an embodiment, the cloud server can be provided as a Glassfish-based runtime, which can be embedded within a WebLogic server, such that the environment can be managed as a unified application server stack. Cloud component modules (e.g., Glassfish modules) can be associated with additional folders within the application server's configuration and packaging hierarchies. This enables the WebLogic server to provide a front-end functionality, which administrators and other users can use to administer and access the cloud environment, while the cloud environment is itself enabled at the back-end by the embedded Glassfish-based runtime. For example, Weblogic administration tools and ports can be used to access and perform basic cloud server administration activities, such as the starting or stopping of a cloud server runtime.

Integration Components (Integration Points)

In accordance with an embodiment, integration components or integration points can include, for example, one or more of:

An integration layer, provided logically on top of the application server, which receives administrative and other access commands, determines where those commands should be directed, including to an embedded cloud server as appropriate, and uses, e.g., REST, to direct the command accordingly.

A logging infrastructure, which enables cloud components within the cloud server to log activities to appropriate logging components of the application server.

A security infrastructure, which enables security functions of the application server to be used to secure cloud components within the cloud server.

A configuration infrastructure, which enables cloud components at the cloud server to store and access configuration information within the application server's domain directory or other configuration mechanism.

The above-described integration components or integration points are provided by way of example, to illustrate the various features of a particular embodiment. In accordance with other embodiments, other integration components or integration points can be used, to address the needs of particular use cases or environments.

Integration Bridge

In accordance with an embodiment, an integration bridge supports integration between the cloud server and the application server. In accordance with an embodiment, the system can use utilize an OSGi (Open Services Gateway initiative) framework, or other dynamic module system or framework to enable a GlassFish-based runtime, to be embedded inside a WebLogic Java EE container.

In accordance with an embodiment, a dynamic module system such as that described in U.S. patent application Ser. No. 14/137,455, titled "SYSTEM AND METHOD FOR PROVISIONING A DYNAMIC MODULE SYSTEM WITHIN A COMPONENT ORIENTED APPLICATION DEVELOPMENT FRAMEWORK", filed Dec. 20, 2013, published as U.S. patent application Publication No. 20150046898, and subsequently issued on Aug. 25, 2015 as U.S. Pat. No. 9,116,542; and U.S. patent application Ser. No. 14/137,483, titled "SYSTEM AND METHOD FOR REFERENCING A DYNAMIC MODULE SYSTEM WITHIN A COMPONENT ORIENTED APPLICATION DEVELOPMENT FRAMEWORK", filed Dec. 20, 2013, published as U.S. Patent Application Publication No. 20150046914, and subsequently issued on Oct. 6, 2015 as U.S Pat. No. 9,152,384; both of which applications are herein incorporated by reference, can be used.

In accordance with an embodiment, the OSGi framework lifecycle matches that of an associated servlet context. Any resource or class visible to an installed web app is visible to the framework loader, which can be used to load classes and resources exported by a system bundle, so that if a shared library is added to a bridging web app, it can be exposed via the system bundle. When the web app is started, the OSGi framework is started. Thereafter, the framework object is bound to JNDI, and is unbound from JNDI when the web app is stopped. By making the framework available in JNDI, other, e.g., Java EE applications have access to the OSGi context.

In accordance with an embodiment, an OSGi framework instance can be used as a container for modules corresponding to cloud components, and can be configured to provide isolation to those modules so that the environment appears as if the cloud components are bootstrapped inside an application server runtime (e.g., the GlassFish-based runtime).

In accordance with an embodiment, services and classes can be selectively made available from an application server runtime to cloud components to address the needs of corresponding cloud modules. Cloud components can run inside the application server runtime as an application, including sharing log destinations with other components running in the application server runtime, using the application server security store, and storing configuration information in the application server domain directory.

Embedded Runtime

Figure 11:
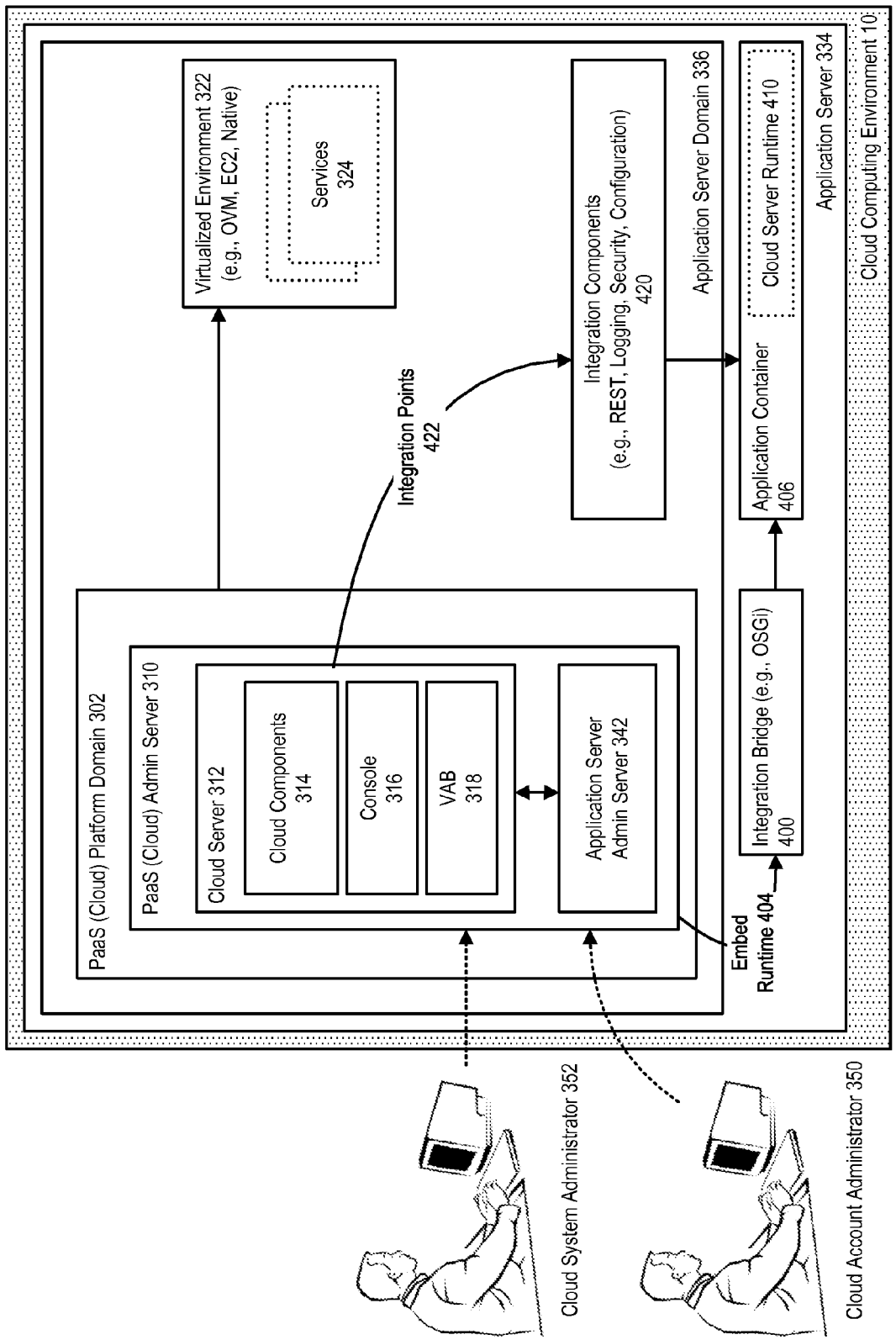
FIG. 11 illustrates a system for integrating a cloud platform with an application server, in accordance with an embodiment.

FIG. 11 illustrates a system for integrating a cloud platform with an application server 334, in accordance with an embodiment. As shown in FIG. 11, in accordance with an embodiment, a cloud administration (admin) server (e.g., CPAS) 310 can include a cloud server 312, which in turn includes one or more cloud components 314, an enterprise management console 316 or other means of configuration, and a virtual assembly builder 318 (e.g., OVAB) or other means of deploying applications.

In accordance with an embodiment, the cloud server can communicate with a virtualized environment 322, for example an OVM, EC2, or native environment, to provide access to resources provisioned as services 324 within that virtualized environment.

In accordance with an embodiment, a runtime for the cloud server (e.g., a Glassfish-based runtime) can be embedded within an application server (e.g., WebLogic) container, so that its cloud domain 302 can execute within the application server domain 336, with its lifecycle bound to the lifecycle of the application server runtime.

In accordance with an embodiment, the cloud admin server can include an application server admin server 342. A cloud account administrator 350 can send service requests, for example via a load-balancing tier, to the cloud admin server; while a PaaS system administrator 352 can similarly interact with the cloud admin server to, for example, monitor, move, or alter provisioned and deployed services.

In accordance with an embodiment, integration between the cloud server and the application server can be provided by an integration bridge 400 (for example, an OSGi framework as described above), which enables the cloud server runtime to be embedded 404 within the application server container 406 as an embedded runtime 410. A plurality of integration components 420 provide integration points 422 that allow cloud server components to be administered and used as part of the application server domain, including for example, administration, logging and diagnostics, security, and configuration management.

Configuration Management

As described above, in accordance with an embodiment, the cloud environment can be managed as a unified application server stack, in which cloud components can be associated with additional folders within the application server's configuration and packaging hierarchies. In accordance with an embodiment, a cloud domain can be configured and packaged as an application server domain, with additional files that contain configurations of cloud components. A cloud platform domain configuration can appear, for example, as shown below, in which the cloudserver directory in the parent directory "config" represents a master copy of the cloud component configuration, and the cloudserver directory in the parent directory "servers" represents a working copy of the cloud component configuration.

```
domain_dir/ #This is the root of configuration store
    startWebLogic.sh # Startup script to start the domain
    /bin/ #Additional WLS provided scripts to the domain
    /config/
        logging.properties # WLS Logging Bridge Configuration
        osgi.properties #OSGi framework configuration
        cloudserver/ # This tree resembles GlassFish domain structure
            /config/
                domain.xml
                some other configuration files
    /pending/
    /logs/
    /servers/
    /<servername>/ #Working direct for each server in the domain
        /data/
            cloudserver/ # This tree resembles GlassFish domain structure
                /config/
                    domain.xml
                    other files
                /osgicache/
                /logs/
```

REST Adapter

In accordance with an embodiment, the system can include a REST adapter that supports communication between the application server and the cloud server, including abstracting the management of cloud components. In accordance with an embodiment, the REST adapter can provide a single administration port which is managed by a networking layer, for example Grizzly for GlassFish. Where possible, existing ports at the application server can be re-used as REST endpoints for the management of cloud components. For example, in a WebLogic application server, a WebLogic port can be re-used to access endpoints for cloud components within the WebLogic domain. In this manner, all communication intended for cloud components can be provided through already-existing ports at the application server.

Logging and Diagnostics

In accordance with an embodiment, cloud components can use logging APIs, which enable messages logged by cloud components to be redirected to, e.g., WebLogic log destinations. Logged messages can be formatted similarly to native messages and processed by a diagnostics dramework, for example WebLogic Diagnostics Framework.

Security

In accordance with an embodiment, the cloud server can use a server security store of an application server with which it is integrated. Security can be managed by the application server for applications running using cloud components.

Work Manager Integration

In accordance with an embodiment, the system can reduce the creation of threads inside cloud components by making an application server (e.g., WebLogic) work manager available as a service for consumption of cloud components.

Packaging and Installation

As described above, in accordance with an embodiment, a cloud platform installation can appear as a unified application server stack. During packaging and installation of a cloud platform binary, an installation file can be parsed to determine the configuration for the cloud domain. Each cloud domain configuration includes a base configuration, together with a configuration for each additional cloud component. For example, in accordance with an embodiment, an exemplary installation file layout can be provided as shown below:

```
MW_HOME/ #This is where one or more FMW components get
installed.
    /oracle_common #Root of common components shared by more than
    one FMW component
    /wlsserver #Root of WebLogic Server component
    /cloudserver #Root of CloudLogic Server component
        /bin
        /common/templates/applications/ #CloudLogic Domain Templates
        /config
        /lib/install/applications/ # System apps
        /modules
    /ovab #Root of OVAB component
    /other components that OVAB depends on
```

Integration Topologies

In accordance with an embodiment, a VAB deployer (e.g., OVAB Deployer) can be alternatively provided running inside an application server, deployed as a web application, or hosted in a separate application server domain and the cloud platform domain configured with remote VAB deployer end points.

Figure 12:
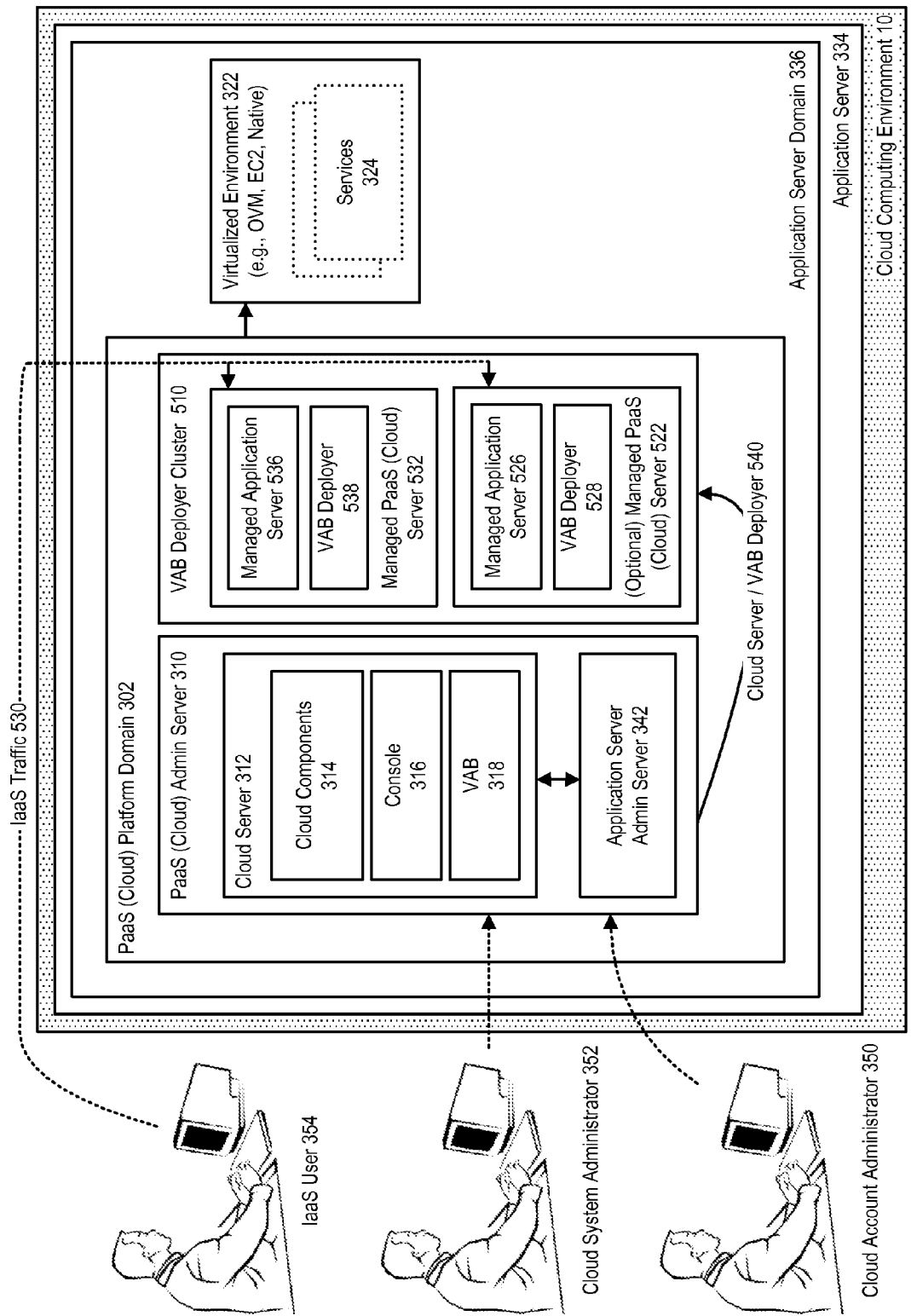
FIG. 12 illustrates a system for integrating a cloud platform with an application server, in accordance with another embodiment.

FIG. 12 illustrates a system for integrating a cloud platform with an application server, in accordance with another embodiment. In accordance with an embodiment, a cloud platform can be deployed within an application server as part of an application server domain which provides access to IaaS users 354. Various components of the cloud platform, including cloud components, a console (e.g., an Enterprise Management cloud control console), and a VAB (e.g., OVAB) can be embedded in an application server runtime, with lifecycles bound to the lifecycle of the application server runtime.

In accordance with an embodiment, the cloud platform can be made part of an application server domain which includes a VAB deployer cluster that contains the administration server, and optionally a plurality of managed cloud servers, each having a managed application server instance and a VAB deployer.

For example, as shown in FIG. 12, in accordance with the domain topology shown therein, the VAB deployer cluster contains at least one managed server 532 having a managed application server instance 534 and a VAB deployer 536, as well as, optionally, additional managed servers, but not including the PaaS cloud admin server. In such a topology, IaaS traffic 530 is sent to all servers in the VAB cluster, except the PaaS cloud admin server, which can communicate separate with the cluster 540.

The above-described topology is provided by way of example, to illustrate the various features therein. In accordance with other embodiments, other types of topologies can be used, to address the needs of particular use cases or environments.

Figure 13:
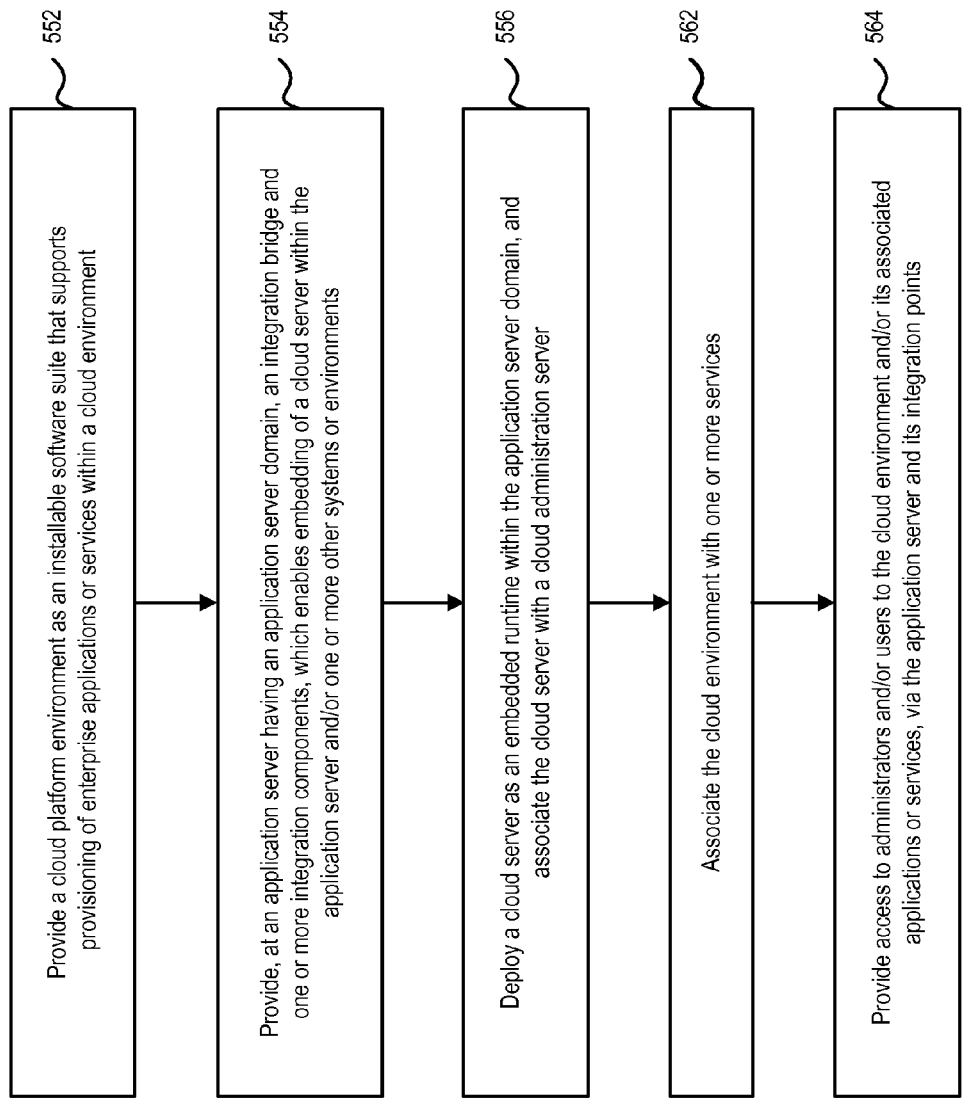
FIG. 13 is a flowchart of a method for integrating a cloud platform with an application server, in accordance with an embodiment.

FIG. 13 is a flowchart of a method for integrating a cloud platform with an application server, in accordance with an embodiment. As shown in FIG. 13, in accordance with an embodiment, at step 552, a cloud platform environment is provided as an installable software suite that supports provisioning of enterprise applications or services within a cloud environment.

At step 554, an integration bridge and one or more integration components is provided at an application server having an application server domain, which enables embedding of a cloud server within the application server environment, and/or one or more other systems.

At step 556, a cloud server is deployed as an embedded runtime within the application server domain, and associated with a cloud administration server.

At step 562, the cloud environment is associated with one or more services.

At step 564, access is provided to administrators and/or other users, to the cloud environment and/or its associated applications or services, via the application server and its integration points.

The above-described process is provided by way of example, to illustrate the various features of a particular embodiment. In accordance with other embodiments, other processes can be used, to address the needs of particular use cases or environments.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for integrating a cloud platform with an application server in a cloud computing environment, comprising:
   a computer, including
      an application server associated with an application server runtime and an application server domain, wherein the application server supports execution of applications as part of the application server domain, and
      a cloud platform component associated with a cloud platform runtime and a cloud platform domain, wherein the cloud platform runtime includes a cloud server and supports provisioning of enterprise applications, wherein the cloud server executes within the application server domain;
   one or more cloud components that provide integration between the cloud platform component and the application server, wherein the one or more cloud components enable at least one of configuration, management, or use of the cloud platform component within the application server domain; and
   a container for cloud modules corresponding to the one or more cloud components, wherein services and classes are selectively made available from the application server runtime to the one or more cloud components.

2. The system of claim 1, wherein the one or more cloud components execute within the application server as an application.

3. The system of claim 1, wherein the cloud domain executes within the application server as the application server domain with additional functionality and configuration components.

4. The system of claim 1, wherein the one or more cloud components are associated with a plurality of administration end points, and wherein the administration end points for the one or more cloud components hosted in the application server are accessible via a single administration port.

5. The system of claim 1, wherein the one or more cloud components are configured to be administered as part of the application server domain, and wherein the application server is configured to provide services to the one or more cloud components including one or more of logging and diagnostics, security, or configuration management.

6. The system of claim 1, further comprising one or a plurality of service management engine (SME) components, which provide a generic means to plug service types into the system, wherein each SME can determine creation of a service and a runtime associated with the service, including a virtualized database SME that can use a container database (CDB) to create pluggable database instances (PDBs).

7. A method of integrating an application server into a cloud computing environment, comprising:
   providing, at a computer,
      an application server associated with an application server runtime and an application server domain, wherein the application server supports execution of applications as part of the application server domain, and
      a cloud platform component associated with a cloud platform runtime and a cloud platform domain, wherein the cloud platform runtime includes a cloud server and supports provisioning of enterprise applications, wherein the cloud server executes within the application server domain; and
   providing
      one or more cloud components that provide integration between the cloud platform component and the application server, wherein the one or more cloud components enable at least one of configuration, management, or use of the cloud platform component within the application server domain, and
      a container for cloud modules corresponding to the one or more cloud components, wherein services and classes are selectively made available from the application server runtime to the one or more cloud components.

8. The method of claim 7, wherein the one or more cloud components execute within the application server as an application.

9. The method of claim 7, wherein the cloud domain executes within the application server as the application server domain with additional functionality and configuration components.

10. The method of claim 7, wherein the one or more cloud components are associated with a plurality of administration end points, and wherein the administration end points for the one or more cloud components hosted in the application server are accessible via a single administration port.

11. The method of claim 7, wherein the one or more cloud components are configured to be administered as part of the application server domain, and wherein the application server is configured to provide services to the one or more cloud components including one or more of logging and diagnostics, security, or configuration management.

12. The method of claim 7, further comprising one or a plurality of service management engine (SME) components, which provide a generic means to plug service types into the system, wherein each SME can determine creation of a service and a runtime associated with the service, including a virtualized database SME that can use a container database (CDB) to create pluggable database instances (PDBs).

13. A non-transitory computer readable storage medium, including instructions stored thereon which when read and executed by one or more computers cause the one or more computers to perform the steps comprising:

provautomatic application server associated with an application server runtime and an application server domain, wherein the application server supports execution of applications as part of the application server domain;

providing a cloud platform component associated with a cloud platform runtime and a cloud platform domain, wherein the cloud platform runtime includes a cloud server and supports provisioning of enterprise applications, wherein the cloud server executes within the application server domain; and providing
    one or more cloud components that provide integration between the cloud platform component and the application server, wherein the one or more cloud components enable at least one of configuration, management, or use of the cloud platform component within the application server domain, and
    a container for cloud modules corresponding to the one or more cloud components, wherein services and classes are selectively made available from the application server runtime to the one or more cloud components.

14. The non-transitory computer readable storage medium of claim 13, wherein the one or more cloud components execute within the application server as an application.

15. The non-transitory computer readable storage medium of claim 13, wherein the cloud domain executes within the application server as the application server domain with additional functionality and configuration components.

16. The non-transitory computer readable storage medium of claim 13, wherein the one or more cloud components are associated with a plurality of administration end points, and wherein the administration end points for the one or more cloud components hosted in the application server are accessible via a single administration port.

17. The non-transitory computer readable storage medium of claim 13, wherein the one or more cloud components are configured to be administered as part of the application server domain, and wherein the application server is configured to provide services to the one or more cloud components including one or more of logging and diagnostics, security, or configuration management.

* * * * *

UNITED STATES PATENT AND TRADEMARK OFFICE
CERTIFICATE OF CORRECTION

PATENT NO. : 9,767,312 B2
APPLICATION NO. : 14/527307
DATED : September 19, 2017
INVENTOR(S) : Sahoo et al.

It is certified that error appears in the above-identified patent and that said Letters Patent is hereby corrected as shown below:

In the Specification

In Column 15, Line 42, delete "dramework," and insert -- framework, --, therefor.

Signed and Sealed this
Twenty-second Day of May, 2018

Andrei Iancu
*Director of the United States Patent and Trademark Office*